Jan. 10, 1933.                R. J. MINSHALL                1,893,591
                        ARRESTING HOOK FOR AIRPLANES
                        Filed March 7, 1932       3 Sheets-Sheet 1
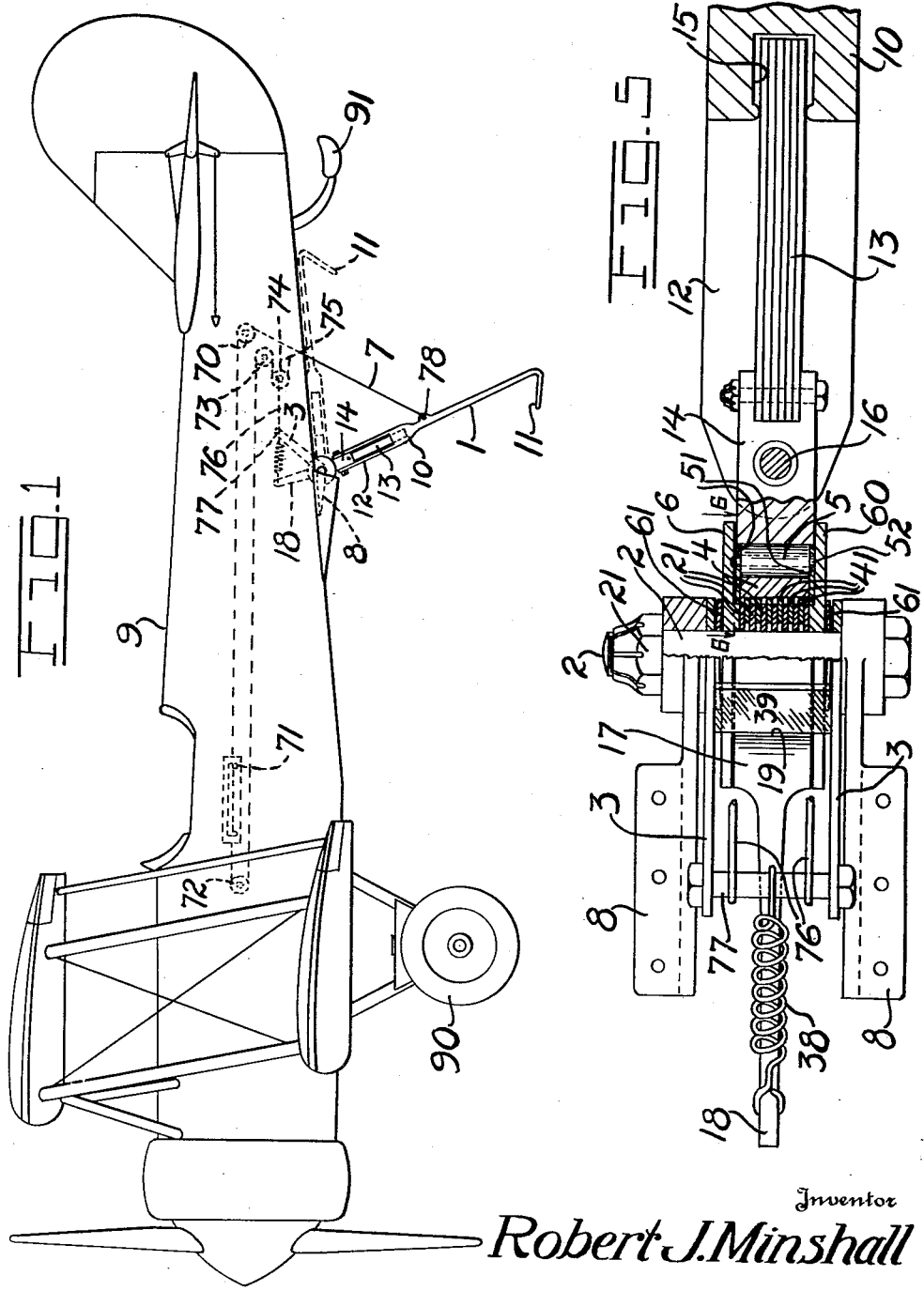
Inventor
Robert J. Minshall
By Charles L. Reynolds
Attorney

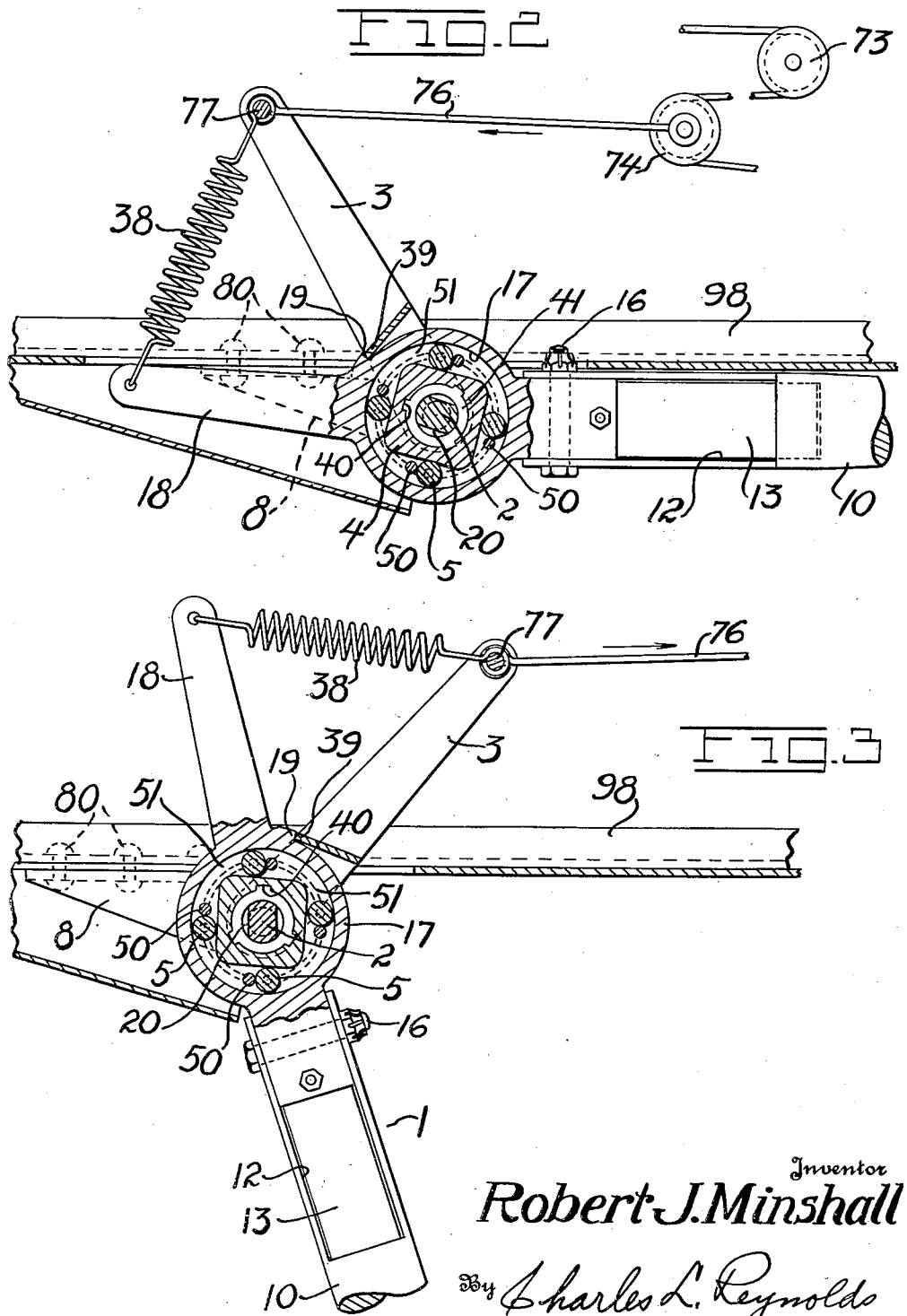

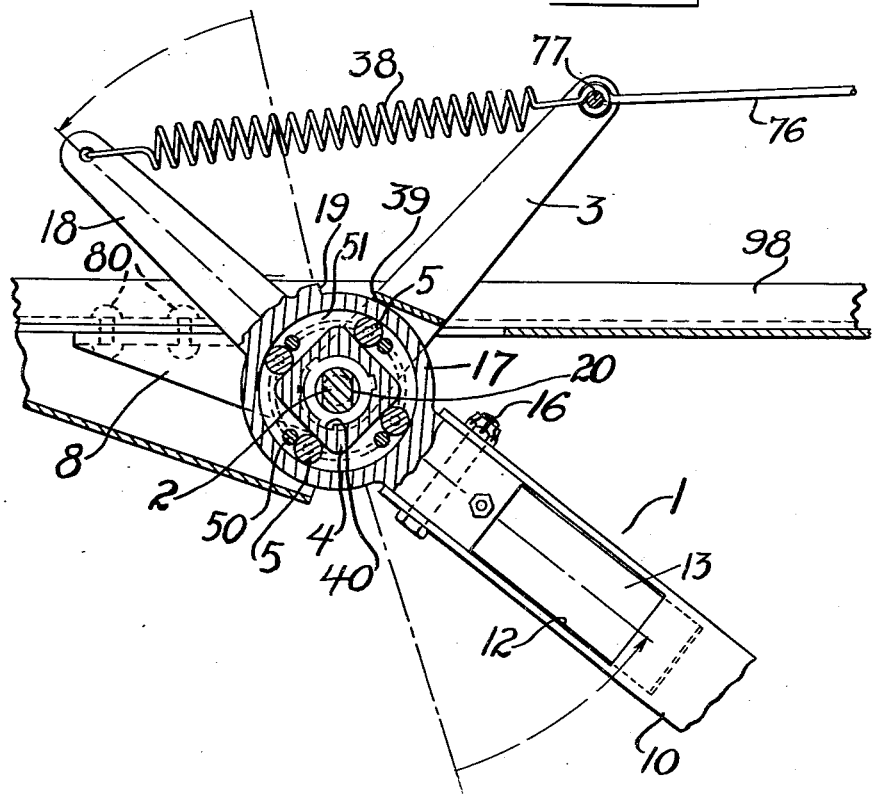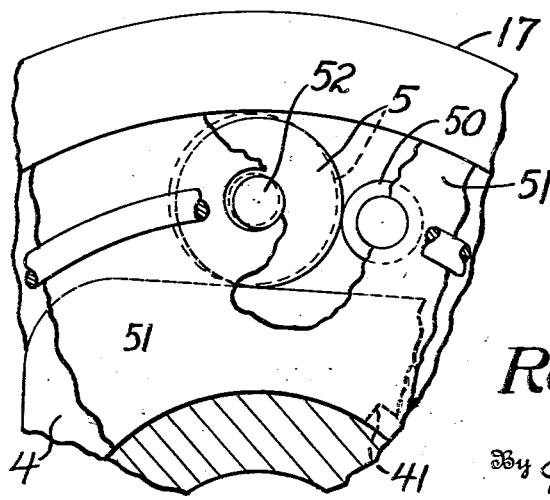

Patented Jan. 10, 1933

1,893,591

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON, A CORPORATION OF WASHINGTON

ARRESTING HOOK FOR AIRPLANES

Application filed March 7, 1932. Serial No. 597,254.

My invention relates to devices generally disposed upon the under side of an airplane fuselage, near the tail, for the purpose of engaginp arresting wires or the like stretched transversely of a landing deck or field, for the purpose of checking the run of the airplane when landing.

Simple hooks were first proposed for such duty, but it quickly became evident that such hooks would be thrown upward by contact with the deck, just prior to alighting, and would not be in position to engage the next transverse wire, and in addition would damage the tail of the airplane by being thrown forcibly thereagainst. Accordingly, dampening means, though they added unwanted weight, were inserted to check the tendency of the hook to throw back against the fuselage, but it required considerable effort on the part of the pilot to move them into operative position, or, when made adjustable to overcome this difficulty, their weight was even greater, and furthermore they were attached to the hook adjacent its swinging end, and therefore required the provision of holes of considerable size in the skin of the fuselage. Such an arrangement is illustrated in my Patent No. 1,749,438, and it is to avoid the necessity for such holes, to cut down the weight of the arresting means, and to simplify the same and concentrate it at the pivot, that my present invention is designed.

More specifically, it is an object of my present invention to provide clutch means which can be associated with the pivot of the hook, which will resist but not entirely prevent any tendency for the hook to move upward from its depending operative position, by means of which it can freely, quickly, and automatically return to such operative position when so moved therefrom, and which can be moved without appreciable effort quickly and freely under the control of the pilot from one position to another.

My invention comprises the novel parts, and the novel combination and arrangement thereof, as shown in the accompanying drawings, described in the specification, and as will be more particularly pointed out by the claims which terminate the same.

In the accompanying drawings I have shown my invention embodied in a form which at present is preferred by me, it being understood that the principles therein illustrated can be incorporated in various specific forms.

Figure 1 is an elevation of a plane equipped with my arresting hook, the same being shown in operative position.

Figure 2 is a view, partly in elevation and partly in section, of my arresting device applied to the fuselage, parts being shown in the inoperative position, and Figure 3 is a similar view with parts in the operative position.

Figure 4 is a view similar to Figures 2 and 3, showing parts in the relative positions assumed by the parts upon the hook striking the deck, just prior to the return of parts to operative position.

Figure 5 is a plan view, with parts in section, of the device with parts in the position of Figure 2.

Figure 6 is a section substantially on the line 6—6 of Figure 5.

The form and type of the airplane, generally indicated at 9, is largely immaterial. Ordinarily, of course, the plane would be a land plane equipped with wheels 90 and a tail skid 91, whereby it can alight upon a field or deck.

Near the tail of the fuselage 9 is mounted an arresting hook, generally designated by the numeral 1, and movable from an inoperative position, shown in dotted lines in Figure 1, wherein it is drawn up closely beneath the tail of the fuselage, adjacent the tail skid 91, to an operative position, shown in full lines in the same figure, wherein it depends well below a line joining the wheels and tail skid, whereby it will be the first member of the airplane to engage a deck or field upon which the plane is about to alight. Thus positioned, and if not thrown upward by contact with the deck, it will engage a transverse wire supported above the field or deck, be deflected upward sufficiently to permit the wheels and tail skid to contact with the deck, and thus will bring the airplane to a standstill, progressively and rapidly decelerating its movement.

The arresting hook 1 would ordinarily be made up of a plurality of parts, but for convenience may be considered as a unit. These parts, however, may comprise a rod 10 having a hook 11 at its outer or swinging end, and bifurcated at its opposite end, indicated at 12, to receive a laterally-flexible spring 13 held in and projecting outwardly from a member 14, whereby its outer end is received in a cavity 15 of the rod 10, and the bifurcated end 12 is pivoted at 16 upon the member 14, thus permitting sidewise flexing of the rod 10 to accommodate any forces tending to flex the hook, without moving it from operative position. The member 14 is formed with an eye 17 and an extension 18, so that, in effect, the hook has a circular eye 17 disposed between its ends, and it is pivotally supported at the axis of the eye 17 for oscillation from the operative position to the inoperative position, or the reverse.

Devices such as the bracket 8 may be employed to secure the arresting hook assembly to the fuselage, and rivets 80 are shown, by means of which these brackets 8 are secured to the longerons 98 or equivalent structural members of the airplane. Pivotally supported in the brackets 8 is a bolt 2, and secured upon the bolt to oscillate therewith is a member such as the arm 3. This may be split, as may best be seen in Figure 5, as a matter of convenience. The arm 3 is disposed at an angle to the extension 18, and a suitable spring—for instance, the extension spring 38—may be interposed between the two, tending to draw them together. Stop means 19 and 39 upon the eye 17 and arm 3, respectively, limit the movement of these two towards each other, but permit relative movement in the opposite direction.

Between the arm 3 and the hook 1 clutch means are interposed which will resist any tendency for relative angular movement between these members, at least, in a direction away from operative position, but which will permit free movement of the hook returning toward operative position, when it has been deflected from such operative position and while the arm remains in the corresponding position. Various clutch means may be employed for the purpose. That shown includes a polygonal—for instance, a substantially square—clutch block 4, surrounding the bolt 2, and rollers 5 interposed between the side surfaces of this block and the circular surface of the eye 17. Between the bolt 2 and the block 4 complemental clutch plates 41 and 21 are positioned, the plates 41 being engageable for rotation with the block 4, and the alternating plates 21 being secured for rotation with the bolt 2. The bolt may have flattened sides 20 to permit this, and the block is shown with grooves 40 for engagement with corresponding lugs upon the clutch plates 41. End plates 6 and 60 cover the eye 17 and press inwardly against the clutch plates, the pressure being regulated through spring washers 61 and the adjustable nut 21 upon the end of the bolt 2. These clutch members resist any relative movement between the block and bolt.

The clutch rollers 5 constitute a one-way clutch between the block and hook. They are so disposed and held by pins 50 secured in rings 51, in which rings trunnions 52 of the rollers 5 are loosely mounted, that they will roll into the angle formed between the converging faces of the block 4 and eye 17 when the hook 1 tends to move in a direction away from operative position relative to the arm 3. Thus the block is rotated, by the engagement of these rollers 5, against the resistance of the clutch plates 21 and 41, but upon any tendency for the hook 1 to move in the opposite position—that is, in a direction toward operative position—the rollers 5 immediately release, and the hook will quickly return to operative position, the block 4 remaining in the position it has now attained. The return movement of the hook is under the influence of its own weight and the spring 38.

It is clear that the arms 3 and 18, and consequently the arm 3 and the hook 1, will oscillate freely so long as there is no relative movement between them. However, if upon striking the deck the hook 1 tends to fly upward, the arm 3 being still held in position corresponding to operative position of the hook, the clutch elements will take effect and resist this movement until it is checked, short of the hook being thrown upward against the under side of the fuselage. Thus damage to the fuselage is prevented. Immediately, however, the clutch rollers 5 will release, and the hook will be quickly thrown downward into operative position where it is ready for engagement with the arresting cables. When it is desired to throw the hook upward—for instance, if the pilot overshoots the mark and decides not to attempt to land when he is close to the deck, and desires quickly to draw the hook upward—this can be done by simultaneous movement of the hook and arm 3 without resistance because there is no relative movement between them.

As a means to accomplish such control of the hook, I may provide the arrangement best illustrated in Figure 1. This comprises a cable system including the cable 7, one end of which is attached to the hook 1, and which extends through a small hole in the skin of the fuselage, over suitable guide pulleys 70 to a control handle 71 located adjacent the pilot's seat. From this control handle the cable extends over additional pulleys such as 72 and 73 to a point in the rear of the arm 3, and I prefer then that it pass over a free sheave 74, and be anchored at 75 to the fuselage. A supplemental cable 76 extends from the free sheave 74 to a connection with the arm 3, and by this means the point of connection at 77 to the arm 3 may be substantially half the radial distance to the point of connection at 78 to the hook 1. The arrangement of sheaves compensates for the difference in length of the two lever arms.

It may be desirable to make the radial distance to the point 78 slightly less than twice the radial distance to the point 77. This gives the hook 1 a slightly greater angular travel than the arm 3, with the result that the hook may be drawn tightly against the under side of the fuselage, so that it will be held there securely while in flight, and will not have any opportunity to free itself and to slap against the fuselage. In general, this is accomplished by reason of connection of the cable 7 to the hook at slightly less than twice the radial distance of the connection to the arm.

By the arrangement disclosed the arresting means are all condensed in small compass and of low weight, at the pivot of the hook. The hook is under the free control of the pilot, to be swung down or up without appreciable effort, at all times. It is so arranged that it will resist any tendency to throw it upward, and when it is thrown upward away from operative position, it will immediately, quickly and freely return to operative position, without care or thought on the part of the pilot. While in flight it is securely held against any whipping movement.

What I claim as my invention is:

1. An arresting hook for airplanes comprising a member having a hooked end and supported for swinging upon the fuselage between operative and inoperative positions, an arm supported from the fuselage and swingable independently of said hooked member, into positions corresponding to operative and inoperative positions of the latter, and a clutch connection therebetween operable to resist relative movement tending to throw the hooked member out of operative position.

2. An arresting hook for airplanes comprising a member having a hooked end and supported for swinging upon the fuselage between operative and inoperative positions, an arm supported from the fuselage and swingable independently of said hooked member, into positions corresponding to operative and inoperative positions of the latter, a clutch connection therebetween operable to resist relative movement tending to throw the hooked member out of operative position, and spring means operable while the arm is in operative position to return the hooked member to operative position.

3. An arresting hook for airplanes comprising a member having a hooked end and supported from the fuselage for swinging between operative and inoperative positions, an arm supported from the fuselage and swingable independently of said hooked member into positions corresponding to operative and inoperative positions of the latter, and a clutch connection between the arm and hooked member operable to resist relative movement tending to throw the hooked member out of operative position, but not resisting movement in the opposite direction.

4. An arresting hook for airplanes comprising a member having a hooked end and supported for swinging upon the fuselage between operative and inoperative positions, an arm supported from the fuselage coaxially with said hooked member but swingable independently of the hooked member, and movable into positions corresponding to operative and inoperative positions of the latter, and clutch means disposed at the common axis of the hooked member and arm and interposed therebetween to resist movement of the hooked member relative to the arm away from operative position.

5. An arresting hook for airplanes comprising a member having a hooked end and supported for swinging upon the fuselage between operative and inoperative positions, an arm supported from the fuselage coaxially with said hooked member but swingable independently of the hooked member, and movable into positions corresponding to operative and inoperative positions of the latter, clutch means disposed at the common axis of the hooked member and arm and interposed therebetween to resist movement of the hooked member relative to the arm away from operative position, an extension projecting from said hooked member, and an extension spring extending between the arm and said extension to return the hooked member, following movement thereof away from operative position, stop means limiting the relative return movement of the arm and hooked member.

6. An arresting hook for airplanes comprising a member having a hooked end and supported for swinging upon the fuselage between operative and inoperative positions, an arm supported from the fuselage coaxially with said hooked member but swingable independently of the hooked member, and movable into positions corresponding to operative and inoperative positions of the latter, a bolt disposed in the pivot axis and secured to the arm, a clutch block surrounding said bolt, clutch means resisting relative rotation of the block and bolt, and other one-way clutch means engageable by movement of the hooked member relative to the arm in a direction away from operative position.

7. An arresting hook for airplanes comprising a member having a hooked end and supported for swinging upon the fuselage between operative and inoperative positions, an arm supported from the fuselage coaxially with said hooked member but swingable independently of the hooked member, and movable into positions corresponding to operative and inoperative positions of the latter, a bolt disposed in the pivot axis and secured to the arm, a clutch block surrounding said bolt, clutch means resisting relative rotation of the block and bolt, other one-way clutch means engageable by movement of the hooked member relative to the arm in a direction away from operative position, and a spring operable to return the hooked member to operative position, immediately following departure therefrom.

8. An arresting hook for airplanes comprising an arm, a bolt secured to the arm and oscillatably mounted upon the airplane, a clutch block surrounding said bolt, complemental clutch means associated with the block and with the bolt to resist relative motion therebetween, a member having a hooked end, its opposite end surrounding the clutch block, one-way clutch means engageable between the hooked member and block upon movement of the hooked member relative to the arm away from operative position, and permitting free return of the hooked member following departure from such operative position, and distant control means for swinging the arm and hooked member from and into operative position.

9. An arresting hook for airplanes comprising a transverse bolt oscillatably mounted upon the airplane, an arm secured thereon to oscillate therewith, a clutch block surrounding said bolt, complemental clutch means associated with the block and with the bolt to resist relative rotation therebetween, a member having a hooked end, and adjacent its other end surrounding the clutch block, and having an extension therebeyond angularly spaced from said arm, a spring tending to draw the arm and said extension together, stop means limiting such movement, one-way clutch means disposed between the hooked member and clutch block, permitting free movement of the hooked member relative to the arm and the block in returning to operative position, following departure thereof, and engageable to initiate rotation of the block and to resist, through the first clutch means, tendency of the hooked member to depart from operative position, and distant control means for swinging the arm and hooked member together from and into operative position.

10. An arresting device for airplanes comprising a transverse bolt oscillatably mounted upon the airplane, an arm secured thereon to oscillate therewith, a polygonal clutch block surrounding said bolt, complemental clutch means associated with the block and with the bolt to resist relative rotation therebetween, a hook having a circular eye intermediate its ends surrounding the clutch block, its end extending opposite the hook being angularly spaced from said arm, a spring tending to draw the arm and said extension together, stop means limiting such movement, clutch rollers disposed between the eye of the hook and the sides of the block, pins associated with said rollers to maintain them within an angle between the wall of the eye and a given side of the block, whereby to cause clutching engagement between the eye and block upon movement of the hook relative to the arm away from operative position, and to permit free return of the hook following departure from such operative position, and distant control means for swinging the arm and hooked member jointly from and into operative position.

11. In combination with an airplane, an arresting hook pivotally supported thereon to swing from operative to inoperative position, an arm coaxially mounted and swingable into corresponding positions, but movable independently of the hook, clutch means interengageable between the hook and arm to resist movement of the hook relative to the arm away from operative position, and means operable while the arm is in operative position to return the hook, following departure therefrom, to operative position.

12. In combination with an airplane, an arresting hook pivotally supported thereon to swing from operative to inoperative position, an arm coaxially mounted and swingable into corresponding positions, but movable independently of the hook, clutch means interengageable between the hook and arm to resist movement of the hook relative to the arm away from operative position, means operable while the arm is in operative position to return the hook, following departure therefrom, to operative position, distant control means, and cable means extending from said control means, the opposite ends of which connect respectively to the arm and to the hook.

13. In combination with an airplane, an arresting hook pivotally supported thereon to swing from operative to inoperative position, an arm coaxially mounted and swingable into corresponding positions, but movable independently of the hook, clutch means interengageable between the hook and arm to to resist movement of the hook relative to the arm away from operative position, means operable while the arm is in operative position to return the hook, following departure therefrom, to operative position, distant control means upon the airplane, and cable means extending from the control means, one end thereof being connected to the arm, and the opposite end being connected to the hook at a greater distance from its pivot axis.

14. In combination with an airplane, an arresting hook pivotally supported thereon to swing from operative to inoperative position, an arm coaxially mounted and swingable into corresponding positions, but movable independently of the hook, clutch means interengageable between the hook and arm to resist movement of the hook relative to the arm away from operative position, means operable while the arm is in operative position to return the hook, following departure therefrom, to operative position, distant control means upon the airplane, and a cable system extending from said control means, one end thereof being connected to the arm a given distance from its pivot axis, and its opposite end being connected to the hook at substantially a multiple of such distance, and the cable system including compensating means to take up the difference in length.

15. In combination with an airplane, an arresting hook pivotally supported thereon to swing from operative to inoperative position, an arm coaxially mounted and swingable into corresponding positions, but movable independently of the hook, clutch means interengageable between the hook and arm to resist movement of the hook relative to the arm away from operative position, means operable while the arm is in operative position to return the hook, following departure therefrom, to operative position, distant control means upon the airplane, and a cable system extending from said control means, one end thereof being connected to the arm a given distance from its pivot axis, and its opposite end being connected to the hook at a distance slightly less than a multiple of such given distance, and the cable system including compensating means to take up the difference in length.

16. In combination with an airplane, an arresting hook pivotally supported thereon to swing from operative to inoperative position, an arm coaxially mounted and swingable into corresponding positions, but movable independently of the hook, clutch means interengageable between the hook and arm to resist movement of the hook relative to the arm away from operative position, cable means to move the arm and hook from one position to the other, one end of said cable means being secured at a given distance from the pivot axis to the arm, and the other end to the hook, at a distance such as to give greater movement to the hook, and means yieldable to accommodate the greater movement of the hook, and to secure it tightly in inoperative position so long as the arm remains in inoperative position.

17. In combination with an airplane, an arresting hook pivotally supported thereon to swing from operative to inoperative position, an arm coaxially mounted and swingable into corresponding positions, but movable independently of the hook, clutch means interengageable between the hook and arm to resist movement of the hook relative to the arm away from operative position, cable means to move the arm and hook from one position to the other, said cable means including a cable one end of which is anchored to the fuselage, its opposite end being connected to the hook, a free sheave about which said cable passes, adjacent the anchored end, and a line extending from said sheave to the arm, the radial distance to the line's connection to the arm being substantially half the radial distance to the cable's connection to the hook.

18. In combination with an airplane, an arresting hook pivotally supported thereon to swing from operative to inoperative position, an arm coaxially mounted and swingable into corresponding positions, but movable independently of the hook, clutch means interengageable between the hook and arm to resist movement of the hook relative to the arm away from operative position, cable means to move the arm and hook from one position to the other, said cable means including a cable one end of which is anchored to the fuselage, its opposite end being connected to the hook, a free sheave about which said cable passes, adjacent the anchored end, and a line extending from said sheave to the arm, the radial distance to the line's connection to the arm being slightly greater than half the radial distance to the cable's connection to the hook, and yieldable means interposed between the arm and hook to accommodate the greater movement of the hook.

19. In combination with an airplane, an arresting hook pivotally supported thereon to swing freely from operative to inoperative position or the reverse, means controllable by the pilot to accomplish such movements, and means associated with the pivot of said hook to resist tendency of the hook to depart from operative position under the influence of external force, and to return the hook immediately following such departure to operative position.

20. In combination with an airplane, an arresting hook pivotally supported thereon to swing freely from operative to inoperative position or the reverse, means controllable by the pilot to accomplish such movements, means associated with the pivot of said hook to resist tendency of the hook to depart from operative position under the influence of external force, and further means yieldable upon such departure and operable immediately thereafter to return the hook to operative position.

21. In combination with an airplane, an arresting hook pivotally supported thereon to swing freely from operative to inoperative position or the reverse, means controllable by the pilot to accomplish such movements, clutch means associated with the pivot of said hook to resist departure of the hook from operative position under the influence of external force, but permitting movement in the opposite direction, and spring means to return the hook immediately following such departure, to operative position.

22. In combination with an oscillatably supported arresting hook for airplanes, an arm coaxially supported and oscillatable therewith, and means operable only upon angular movement of the hook relative to the arm to resist movement of the hook in a direction away from operative position, but freely permitting return movement to operative position.

23. In combination with an oscillatably supported arresting hook for airplanes, an arm coaxially supported and oscillatable therewith, means operable only upon angular movement of the hook relative to the arm to resist movement of the hook in a direction away from operative position, but freely permitting return movement to operative position, and a spring to assist such return movement.

24. In combination with an oscillatably supported arresting hook for airplanes, a member freely oscillatable therewith between operative and inoperative positions of the hook, and means to resist movement of the hook relative to such member in a direction away from operative position, but freely permitting such relative movement of the hook in the opposite direction.

25. In combination with an airplane, an arresting hook pivotally supported thereon to swing freely from operative to inoperative position or the reverse, means controllable by the pilot to accomplish such movements, and means disposed concentrically with the pivot axis of said hook to positively resist tendency of the hook to depart from operative position under the influence of external force, said last mentioned means being connected to swing with said hook upon operation of the controlling means by the pilot.

Signed at Seattle, King County, Washington, this 24th day of February, 1932.

ROBERT J. MINSHALL.